Jan. 26, 1926.

C. W. OBERT 1,571,022

PRESSURE RELIEF DEVICE

Filed March 21, 1923

INVENTOR
Casin W. Obert
BY
C. P. Goepel.
ATTORNEY

Patented Jan. 26, 1926.

UNITED STATES PATENT OFFICE.

CASIN W. OBERT, OF MOUNT VERNON, NEW YORK.

PRESSURE-RELIEF DEVICE.

Application filed March 21, 1923. Serial No. 626,715.

*To all whom it may concern:*

Be it known that I, CASIN W. OBERT, a citizen of the United States, and resident of the city of Mount Vernon, in the county of Westchester and State of New York, have invented certain new and useful Improvements in Pressure-Relief Devices, of which the following is a specification.

This invention relates to means for relieving the interior of gas and liquid containers of pressure beyond a predetermined extent; and while applicable to containers of various kinds, is especially adapted and designed for use in connection with those containing steam and hot water.

Containers of the class specified are ordinarily provided with pressure relief or blow-off devices of various kinds, most, if not all, of which consist of a relief valve which is liable under certain conditions to become fast to, and bind upon, its seat to such an extent as to render the valve inoperative for the purposes for which it is intended.

This invention has for its general object to provide a pressure relief device for fluid and liquid containers, that is simple in construction, positive and effective in operation, and durable and reliable in use, and which cannot fail to afford relief to the container in case of overpressure therein.

A further object of the invention is to provide a pressure relief device with a primary and a secondary relief member, each adapted to operate independently of the other, but not simultaneously, and both being subject to the same operating force.

A further object of the invention is to provide a primary relief member and a secondary relief member for a pressure relief device of the character stated, in which the secondary relief member operates only at a pressure higher than that at which the primary relief member normally operates.

With the foregoing and other objects in view, hereinafter stated, the invention consists of the novel construction, combination, and arrangement of elements hereinafter specified and illustrated in the accompanying drawings, wherein is shown a device embodying the invention in its preferred form, and also a modification thereof, but it is to be understood that changes, variations, and modifications thereof may be resorted to, without departing from the scope of the invention.

In describing the invention herein, reference is had to the accompanying drawings, which form a part of this specification, and wherein like numerals of reference indicate corresponding parts throughout the several views, and wherein.

Figures 1, 3:
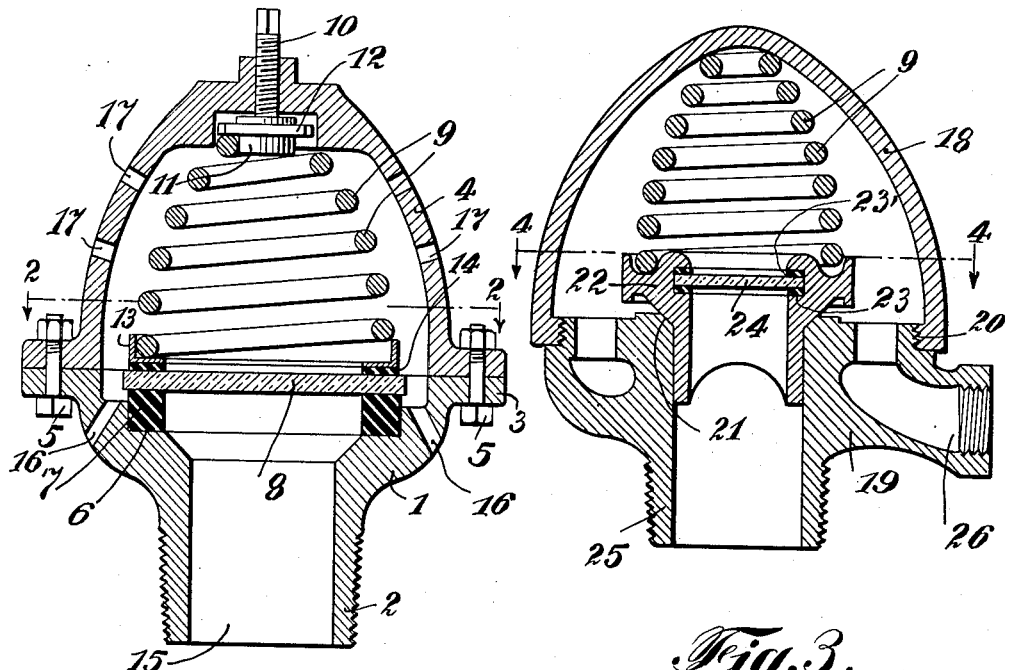
Fig. 1 is a vertical central section of a device embodying the invention.
Fig. 3 is a central vertical section of a modification of the invention.
Figures 2, 4:
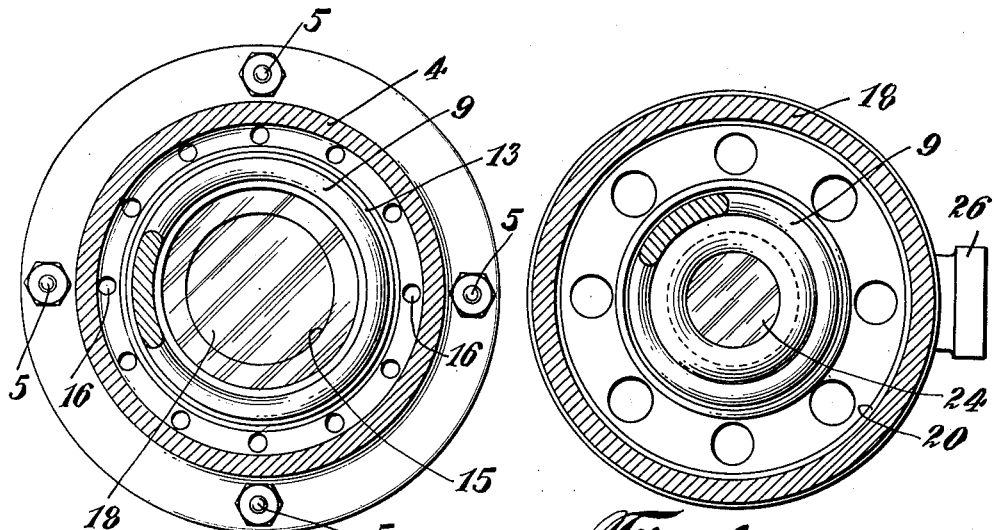
Fig. 2 is a horizontal section taken on the line 2—2 of Fig. 1.
Fig. 4 is a horizontal section taken on the line 4—4 of Fig. 3.

As illustrated in the drawings, the device includes an outer casing, which may be of any suitable construction, preferably in two sections suitably attached or connected together. One section may be provided with a supporting base member 1 having a tubular sleeve or neck 2 with a threaded end, adapted to engage a correspondingly threaded pipe connection, whereby the device may be connected with a gas or fluid container.

A flange 3 is shown formed with the base member 1 and is connected in any suitable manner with a corresponding flange formed on an outer casing 4, such as by means of bolts and nuts 5, or by a threaded connection.

In the base member 1 an annular ledge or seat 6 is provided, upon which is placed an annular ring 7 of rubber, or other elastic composition of yielding nature, or some comparatively soft metal, such as lead or copper, in order to take up any shock that may be imparted to the valve.

Upon this soft and yielding annular ring there is supported a valve disk or diaphragm 8 of a brittle, frangible material, such as glass or porcelain, which is non-corrosive and non-ductile.

The valve is held against its seat normally by means of a coiled spring 9, one end of which bears against a tensioning device of any suitable construction, such as a threaded stem 10 having a hub 11 provided with a flange 12, forming by their junction a recess, adapted to hold the outer end of spring 9 and serve as a bearing therefor, or the tensioning device may be dispensed with in some cases, if desired.

The other end of the spring 9 bears upon the frangible valve disk or diaphragm, the pressure thereof being distributed evenly by means of a cupped washer 13, or other suitable form of annular retaining member. Between the washer or annular member and the frangible disk, soft or yielding material 14 of any suitable kind, such as rubber, leather, or lead, is placed. By means of such construction, the frangible valve disk or diaphragm 8 is protected against injury arising from any jar or shock communicated to said member by or through the action of the valve.

The frangible member 8 is preferably made of glass, although it may be made of any other suitable material having similar capabilities.

The fracture or breaking point of the disk or diaphragm of glass depends upon its thickness relative to its area, and responds to a rule that is uniform within limits.

In carrying out the invention, the valve disk or diaphragm 8 is provided of such thickness relative to its width or area that all normal operating pressures at which the valve may be called upon to act are well within the pressure corresponding to the breaking or fracture point thereof. The disk is so designed that the breaking or fracture point is considerably higher than the pressure at which the valve is set or designed to be operated.

When the device is in use, the valve disk or diaphragm is held normally on its seat by the tension of the spring 9, but when the pressure within the container exceeds a predetermined point, the excess pressure acting against the valve disk or diaphragm 8 causes it to rise from its seat and permit gas or water to flow from the interior of the shell or casing, and out under the edges of the raised disk into the interior of the casing whence it escapes through apertures 16 and 17 formed in said casing. The number, size, or position of the discharge openings is not an essential feature of the invention.

When so operating, the disk or diaphragm 8 forms the essential part of the valve, and serves as a closure for the valve opening and as a bearing against which the gases or liquids may be forced to raise the valve off its seat.

But it sometimes happens that a valve disk sticks to, or binds upon, its seat and does not respond to the lifting force or pressure of the force operating thereon at the pressure for which the valve is set to operate. In such cases relief is denied to the excess pressure within the container, and injury to and destruction of, the container, and consequential external damage, frequently follow.

When the device is in operation, however, if for any reason the valve disk should bind on its seat and fail to respond to the predetermined amount of excess pressure, the pressure within the casing, as it continues to increase, eventually reaches the point at which it overcomes the resistance of the frangible plate 8, fractures the said plate, and permits a sufficient part of the contents of the container to pass out through the opening formed by the fracture of the valve disk or diaphragm to relieve the excess pressure and prevent damage. The excess flows into the discharge member, from whence it passes through the discharge apertures 16 and 17 into the atmosphere. The valve is thence rendered inoperative until a new frangible valve disk or diaphragm is inserted in place of the fractured disk, but nevertheless the fracture has served a useful purpose, and has not only served as an effective warning against a dangerous condition of over-pressure, but also perhaps prevented damage and saved loss of life and property. The construction of the device is such that in case of rupture of the frangible disk, a new spare disk may be easily inserted, whereupon the valve is enabled to again act as hereinbefore described.

While for most uses and purposes I prefer the construction hereinbefore described, a casing may be provided, such as is shown in Fig. 3, wherein the outer section 18 is connected with a base 19.

These sections of the casing may be connected together by a threaded connection, as shown at 20, or by any other convenient form of attachment.

In the construction shown in Fig. 3 there is embodied a metal seat 21 for a relief or safety valve of a type that is commonly used for the protection of boilers and other pressure vessels from over pressure.

The valve 22 is shown as having a bearing surface of usual construction comprising a brass or bronze ring forming a ground fit to its seat, although it is to be understood that any other seat or other approved type of metal valve construction may be used for this member.

This valve is held against its seat normally by means of a coil spring 9, one end of which bears against the inner wall of the outer casing 18, or against a tensioning device of any suitable construction, as shown in Fig. 1.

In an annular recess provided in the upper portion of the valve ring, there is inserted a frangible disk 24 of non-corrosive, non-ductile material, such as glass or porcelain, and retained therein in any suitable manner. In the form shown, the frangible disk is inserted in a recess and held by soft yielding material, such as rubber, cement or lead 23—23', so placed in the recess as to protect the frangible member against injury arising from any jar or shock communicated to it by or through the action of the valve. If, however, the pressure within the casing should for any reason not be relieved, and rises above the breaking point of the plate 24, the plate then becomes fractured, and gas or liquid passes into the outer section 18 and escapes through the discharge nipple 26 into any suitable pipe connection.

The device shown and described herein may be made to operate as a unitary valve having a double capacity, namely, the function of an ordinary relief valve, together with an auxiliary relief member, operating independently of each other in respect to function, and at different times, although controlled by the same operating force.

What I claim as new and desire to secure by Letters Patent is:

1. A pressure relief valve comprising a casing having an inlet aperture, a discharge aperture and a valve seat between said apertures, a valve member cooperating with said seat for closing the communication between said apertures, means for maintaining said valve on its seat under normal fluid pressures exerted through the inlet aperture and yieldable to permit said valve to open when a predetermined pressure is reached, cushioned means normally movable with said valve member but adapted to rupture by the pressures when it exceeds the normal increases of pressure in the event that the valve fails to open and move from its seat and is prevented from operating normally.

2. A pressure relief valve comprising a casing having an inlet aperture, a discharge aperture and a valve seat between said apertures, a valve member cooperating with said seat for closing the communication between said apertures, said valve member including a non-corrosive, non-ductile frangible diaphragm, means for cushioning the same, means for maintaining said valve member on its seat under normal fluid pressures exerted through the inlet aperture and yieldable to permit said valve to open when a predetermined pressure is reached, said frangible diaphragm being adapted to rupture to abnormal increases of pressures in the event that the valve fails to open and move from its seat and is prevented from operating normally.

3. A pressure relief valve comprising a casing having an inlet aperture, a discharge aperture and a valve seat between said apertures, a valve member cooperating with said seat for closing the communication between said apertures, means for maintaining said valve on its seat under normal fluid pressures, exerted through the inlet aperture and yieldable to permit said valve to open when a predetermined pressure is reached, said valve member having an aperture through it and a secondary member in said aperture comprising non-corrosive non-ductile frangible member adapted to break under abnormal increases of pressures in the event that the valve fails to open upon reaching and passing a predetermined pressure, and means for cushioning said secondary member.

In testimony that I claim the foregoing as my invention, I have signed my name hereunder.

CASIN W. OBERT.